United States Patent
Xu et al.

(10) Patent No.: US 10,203,784 B2
(45) Date of Patent: Feb. 12, 2019

(54) TOUCH PANEL, METHOD FOR MANUFACTURING THE SAME AND TOUCH DISPLAY DEVICE

(71) Applicant: BOE TECHNOLOGY GROUP CO., LTD., Beijing (CN)

(72) Inventors: Chuanxiang Xu, Beijing (CN); Yonglian Qi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/106,212

(22) PCT Filed: Oct. 23, 2015

(86) PCT No.: PCT/CN2015/092670
§ 371 (c)(1),
(2) Date: Jun. 17, 2016

(87) PCT Pub. No.: WO2016/095609
PCT Pub. Date: Jun. 23, 2016

(65) Prior Publication Data
US 2016/0364034 A1    Dec. 15, 2016

(30) Foreign Application Priority Data
Dec. 15, 2014    (CN) .......................... 2014 1 0776006

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01)

(58) Field of Classification Search
CPC .................. G06F 3/041; G06F 2203/04103
See application file for complete search history.

(56) References Cited

U.S. PATENT DOCUMENTS

| 2012/0098784 | A1 | 4/2012 | Kim | |
|---|---|---|---|---|
| 2013/0249863 | A1* | 9/2013 | Misaki | G06F 3/044 345/174 |
| 2014/0320761 | A1* | 10/2014 | Misaki | G06F 3/044 349/12 |

FOREIGN PATENT DOCUMENTS

| CN | 102073158 A | 5/2011 |
|---|---|---|
| CN | 102314254 A | 1/2012 |

(Continued)

OTHER PUBLICATIONS

Chinese Rejection Decision, for Chinese Patent Application No. 20140776006.8, dated Jul. 4, 2017, 26 pages.

(Continued)

*Primary Examiner* — Amr Awad
*Assistant Examiner* — Maheen Javed
(74) *Attorney, Agent, or Firm* — Kinney & Lange, P.A.

(57) ABSTRACT

Embodiments of the present disclosure discloses a touch panel; a plurality of second electrodes; a plurality of the first electrode leads for leading the first electrodes, which are connected to each other, out of a touch area; a plurality of the second electrode leads for leading the second electrodes, which are connected to each other, out of the touch area. The touch panel further includes at least one transparent conductive layer which is formed on at least one surface of each of the first and/or second electrode leads and which is formed in the same layer as at least one of the first and second electrodes, the first and second connecting wires. The embodiments of the present disclosure may prevent oxidation of the electrode leads and increase adhesion without increasing manufacture processes.

15 Claims, 5 Drawing Sheets

(56) References Cited

FOREIGN PATENT DOCUMENTS

| | | |
|---|---|---|
| CN | 103019493 A | 4/2013 |
| CN | 103092411 A | 5/2013 |
| CN | 103677431 A | 3/2014 |
| CN | 104407743 A | 3/2015 |
| JP | 2010002984 A | 1/2010 |

OTHER PUBLICATIONS

First Chinese Office Action (including English translation) dated Nov. 28, 2016, for corresponding Chinese Application No. 201410776006.8.
Second Chinese Office Action (including English translation) dated Apr. 28, 2017, for corresponding Chinese Application No. 201410776006.8.
Supplemental European Search Report, for European Patent Application No. 15868659.2, dated Jan. 31, 2018, 7 pages.
International Search Report and Written Opinion from PCT Application Serial No. PCT/CN2015/092670, dated Jan. 19, 2016, 11 pages.

* cited by examiner

TOUCH PANEL, METHOD FOR MANUFACTURING THE SAME AND TOUCH DISPLAY DEVICE

CROSS-REFERENCE TO RELATED APPLICATION

This application claims the benefit of Chinese Patent Application No. 201410776006.8 filed on Dec. 15, 2014 in the State Intellectual Property Office of China, the whole disclosure of which is incorporated herein by reference.

FIELD OF THE INVENTION

Embodiments of the present disclosure relates to the field of touch display technology, especially relates to a touch panel and a method for manufacturing it, and a touch display device.

DESCRIPTION OF THE RELATED ART

Touch screens as an intelligent man-machine interaction product, has been widely used in many areas of social production and social life, especially has been developed quickly in the field of consumer electronic products, such as smart phone, tablet PC.

Capacitive touch screens as a new generation of touch screen product following resistive touch screens, has undergone a qualitative leap in term of performance compared with the previous generation of products, which is reflected not only in being more sensitive, supporting multi-touch, but also in a longer serving life.

FIGS. 1 (*a*)-(*b*) illustrates a schematic exploded view of the planar structure of the touch panel in prior art, and FIG. 2 illustrates a schematic view of the cross section of the touch panel in prior art. As shown in FIGS. 1(*a*)-(*b*) and 2, the touch panel comprises a first transparent conductive layer 101, a transparent insulating media layer 102, a second transparent conductive layer 103, a metal layer 104, which are provided on a glass substrate in this order. The first transparent conductive layer 101 serves to connect two adjacent second electrodes 1032 as a bridge. The second transparent conductive layer 103 comprises a plurality of first electrodes 1031 and a plurality of second electrodes 1032 which are arranged to intersect to each other and connecting wires 1033 connecting two adjacent first electrodes 1031. The metal layer 104 comprises metal leads 1041 of the first electrodes and metal leads 1042 of the second electrodes, which are located at a side of the plurality of the first electrodes 1031 and a plurality of the second electrodes 1032 and the metal leads finally are connected to a flexible printed circuit board (FPC).

Since the metal leads are easily oxidized, aluminum neodymium is utilized for making metal leads in consideration of low-cost and low resistivity in the art. Furthermore, in order to reduce the risk of being oxidized, protection layers are provided on the upper and lower surfaces of the metal leads. For example, metal leads which are provided with protective layers generally employ a laminate structure of molybdenum/aluminum neodymium/molybdenum. To further prevent products from being oxidized and causing resistance to be increased during the production/preservation and subsequent using process, the manufacturers use a laminate structure of molybdenum niobium/aluminum neodymium/molybdenum niobium in some high end products. Such a laminate structure has problems of being expensive, engraved corrosion rate being slow, which causes the metal leads with a laminate structure to be difficult for etching. Further, it is also necessary to develop new targets (i.e., molybdenum niobium). At the same time, the structure of the protective layers which are made separately at top and bottom sides of the metal leads will increase additional processes.

SUMMARY OF THE INVENTION

In order to overcome or alleviate at least one aspect of the above mentioned disadvantages, there is provide a touch panel and a method for manufacturing it, as well as a touch display device in the embodiments of the present disclosure.

According to an aspect of the present disclosure, there is provided a touch panel, including a plurality of first electrodes which are connected to each other in a first direction by first connecting wires;

a plurality of second electrodes which are connected to each other in a second direction by second connecting wires;

a plurality of a first electrode leads for leading the first electrodes, which are connected to each other in the first direction, out of a touch area;

a plurality of a second electrode leads for leading the second electrodes, which are connected to each other in the second direction, out of the touch area, the touch panel further includes at least one transparent conductive layer which is formed on at least one surface of each of the first and/or second electrode leads and which is formed in the same layer as at least one of the first and second electrodes, the first and second connecting wires.

The at least one transparent conductive layer comprises a first transparent conductive layer which is formed on the upper surface of each of the first and/or second electrode leads.

The first transparent conductive layer is further formed on at least one lateral surface of each of the first and/or second electrode leads.

The at least one transparent conductive layer further comprises a second transparent conductive layer which is formed on the lower surface of each of the first and/or second electrode leads, and which contacts the first transparent conductive layer so as to form enclosed spaces which package respective ones of the first and/or second electrode leads.

The first connecting wires are a plurality of first connecting wires which are connected between the plurality of the first electrodes respectively, and the second connecting wires are a plurality of second connecting wires which are connected between the plurality of the second electrodes respectively.

An insulating layer is formed between the first and second connecting wires.

The first transparent conductive layer is formed in the same layer as the first and second electrodes, and the first connecting wires, and the second transparent conductive layer is formed in the same layer as the second connecting wires.

The first transparent conductive layer is formed in the same layer as the second connecting wires, and the second transparent conductive layer is formed in the same layer as the first and second electrodes, and the first connecting wires.

The first transparent conductive layer is formed in the same layer as the first electrodes and connecting wires, and the second transparent conductive layer is formed in the same layer as the second electrodes and connecting wires.

The at least one transparent conductive layer, the first and second electrodes and the first and second connecting wires are made of a same material.

The at least one transparent conductive layer, the first and second electrodes and the first and second connecting wires are made of a transparent metal oxide.

The transparent metal oxide comprises indium tin oxide or zinc oxide.

The touch panel further comprises a light-shielding layer which is located in a border area around the touch area.

The first and second electrode leads are located on the light shielding layer.

According to a second aspect of the present disclosure, there is provided a method for manufacturing touch panel, including forming a plurality of a first electrodes, a plurality of a second electrodes, a plurality of a first electrode leads and a plurality of a second electrode leads; the plurality of first electrodes are connected to each other in a first direction by first connecting wires, the plurality of second electrodes are connected to each other in a second direction by second connecting wires; the plurality of the first electrode leads serve to lead the first electrodes, which are connected to each other in the first direction, out of a touch area; the plurality of the second electrode leads serve to lead the second electrodes, which are connected to each other in the second direction, out of the touch area.

The method further includes forming at least one transparent conductive layer in the same layer as at least one of the first and second electrodes, the first and second connecting wires, and the at least one transparent conductive layer is formed on at least one surface of each of the first and/or second electrode leads.

The at least one transparent conductive layer comprises a first transparent conductive layer which is formed on the upper and lateral surfaces of each of the first and/or second electrode leads.

The at least one transparent conductive layer further comprises a second transparent conductive layer which is formed on the lower surface of each of the first and/or second electrode leads, and which contacts the first transparent conductive layer so as to form enclosed spaces which package respective ones of the first and/or second electrode leads.

In an embodiment, the method comprises forming a first transparent conductive material layer and performing a patterning process thereto, so as to form a pattern comprising a plurality of a first electrodes, first connecting wires, a plurality of a second electrodes and a second transparent conductive layer; the second transparent conductive layer is formed at a position corresponding to the plurality of the first and second electrode leads;

forming an insulating layer and performing a patterning process thereto so as to form an insulating layer pattern;

forming a lead material layer and performing a patterning process thereto, so as to form a pattern comprising a plurality of a first and a second electrode leads, forming a second transparent conductive material layer and performing a patterning process thereto, so as to form a pattern comprising a second connecting wires and a first transparent conductive layer; the first transparent conductive layer being formed on the upper and lateral surfaces of the first and/or second electrode leads, wherein the first transparent conductive layer contacts the second transparent conductive layer so as to form enclosed spaces which package respective ones of the first and/or second electrode leads, the insulating layer pattern at least comprises a pattern corresponding to an intersection area of the first and second connecting wires.

In an embodiment, the method comprises forming a first transparent conductive material layer and performing a patterning process thereto, so as to form a pattern comprising: second connecting wires and a second transparent conductive layer; the second transparent conductive layer is formed at a position corresponding to the plurality of the first and second electrode leads;

forming an insulating layer and performing a patterning process thereto so as to form an insulating layer pattern;

forming a lead material layer and performing a patterning process thereto, so as to form a pattern comprising a plurality of a first and a second electrode leads, forming a second transparent conductive material layer and performing a patterning process thereto, so as to form a pattern comprising a plurality of a first electrodes, first connecting wires, a plurality of the second electrodes and a first transparent conductive layer; the first transparent conductive layer being formed on the upper and lateral surfaces of the plurality of the first and second electrode leads, wherein the first transparent conductive layer contacts the second transparent conductive layer so as to form enclosed spaces which package respective ones of the first and second electrode leads, the insulating layer pattern at least comprises a pattern corresponding to an intersection area of the first and second connecting wires.

In an embodiment, the method further comprises forming a first transparent conductive material layer and performing a patterning process thereto, so as to form a pattern comprising a plurality of a first electrodes, first connecting wires and a second transparent conductive layer; the second transparent conductive layer is formed at a position corresponding to the plurality of the first and second electrode leads;

forming an insulating layer and performing a patterning process thereto so as to form an insulating layer pattern;

forming a lead material layer and performing a patterning process thereto, so as to form a pattern comprising a plurality of a first and a second electrode leads, forming a second transparent conductive material layer and performing a patterning process thereto, so as to form a pattern comprising a plurality of the second electrodes, a second connecting wires and a first transparent conductive layer; the first transparent conductive layer being formed on the upper and lateral surfaces of the plurality of the first and second electrode leads, wherein the first transparent conductive layer contacts the second transparent conductive layer so as to form enclosed spaces which package respective ones of the first and second electrode leads, the insulating layer pattern at least comprises a pattern corresponding to a plurality of the first electrode area.

According to a third aspect of the present disclosure, there is provided a touch display device comprising a touch panel as described above.

In the above solutions provided in various exemplary embodiments of the present disclosure, the second and first transparent conductive layers are used to package the first and second electrode leads, which may prevent the first and second electrodes leads from being oxidized and save the step of making a protection layer on the electrode leads separately to prevent oxidation. Further, the first and second electrode leads are package by the second and first transparent conductive layers completely without an exposed area, which may prevent the first and second electrode leads from being oxidized and may increase adhesion. At the same time, as the second and first transparent conductive layers are respectively formed in the same layer as at least one of the first and second electrodes, the first and second connecting wires, there is no additional manufacturing steps when making the above touch panel, which reduces procedures and improve production efficiency compared with the prior art.

DETAILED DESCRIPTION OF PREFERRED EMBODIMENTS OF THE INVENTION

Figure 1:
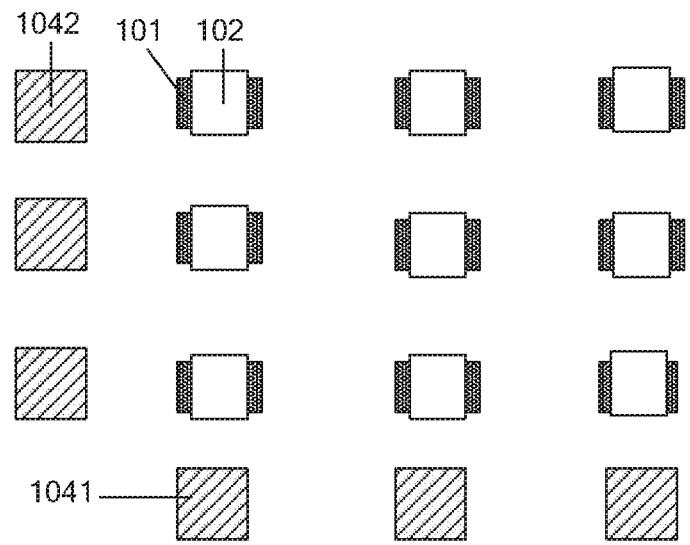
FIG. 1(a)-(b) is an exploded planer schematic view of the touch panel in prior art.
Figure 1:
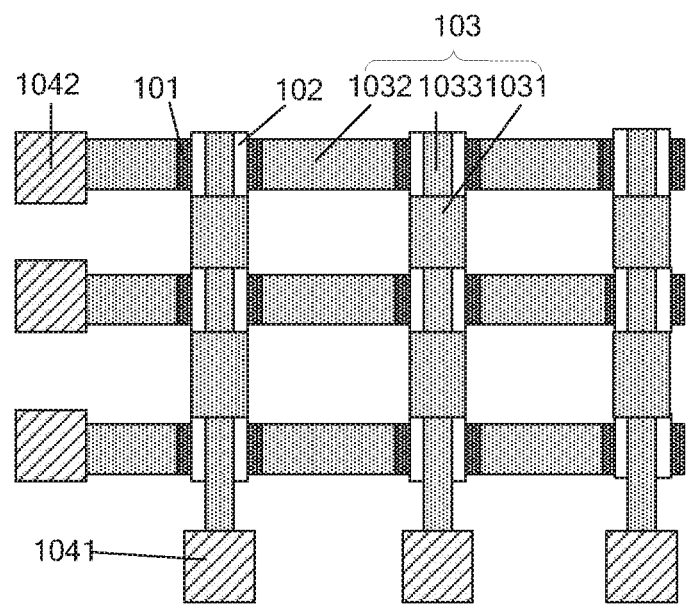
Figure 2:
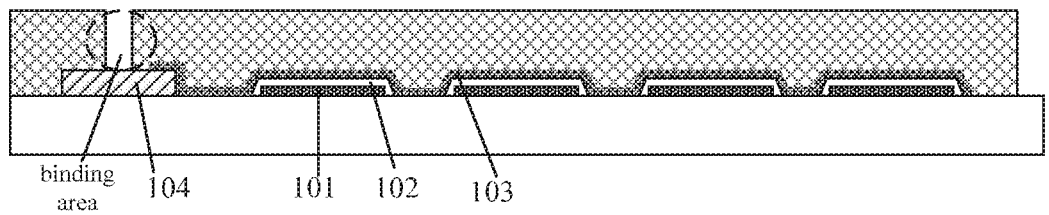
FIG. 2 is a schematic cross sectional view of the touch panel in prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present disclosure, there is provided a touch panel, including a plurality of first electrodes which are connected to each other in a first direction by first connecting wires;

a plurality of second electrodes which are connected to each other in a second direction by second connecting wires;

a plurality of a first electrode leads for leading the first electrodes, which are connected to each other in the first direction, out of a touch area;

a plurality of a second electrode leads for leading the second electrodes, which are connected to each other in the second direction, out of the touch area, wherein the touch panel further includes at least one transparent conductive layer which is formed on at least one surface of each of the first and/or second electrode leads and which is formed in the same layer as at least one of the first and second electrodes and the first and second connecting wires.

Here the at least one surface of the first and/or second electrode leads comprises at least one of the upper and lower surface or at least one lateral surface of the front and back, left and right surfaces of the electrode leads.

Further, the at least one transparent conductive layer comprises a first transparent conductive layer which is formed on the upper surface of each of the first and/or second electrode leads.

Further, the first transparent conductive layer is also formed on at least one lateral surface of each of the first and/or second electrode leads.

Further, the at least one transparent conductive layer comprises a second transparent conductive layer which is formed on the lower surface of each of the first and/or second electrode leads, and which contacts the first transparent conductive layer so as to form enclosed spaces which package respective ones of the first and/or second electrode leads.

The first and second electrodes are one of the emitting and receiving electrodes respectively.

The structure of the touch panel according to embodiments of the present disclosure is now described in detail.

Figure 3:
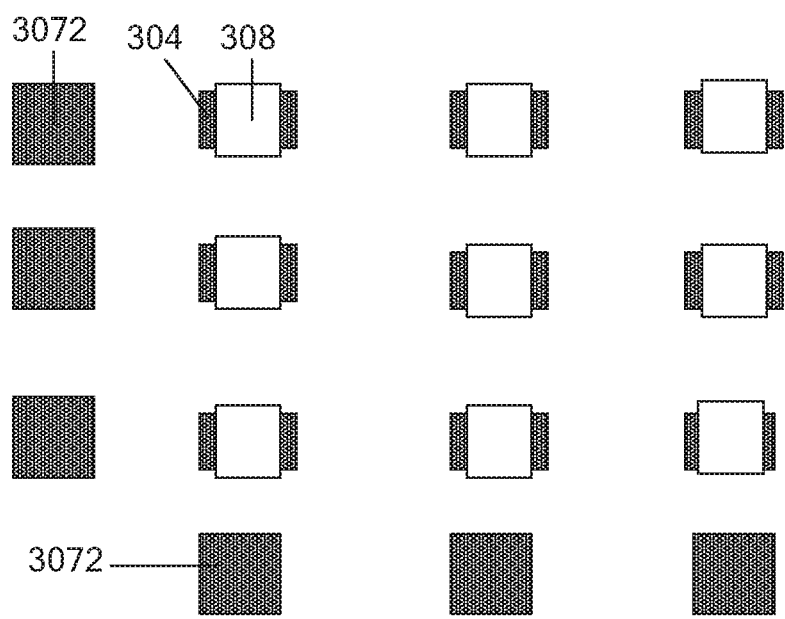
FIGS. 3(a)-(c) are schematic cross sectional views of touch panel according to the first embodiment of the present disclosure.
Figure 3:
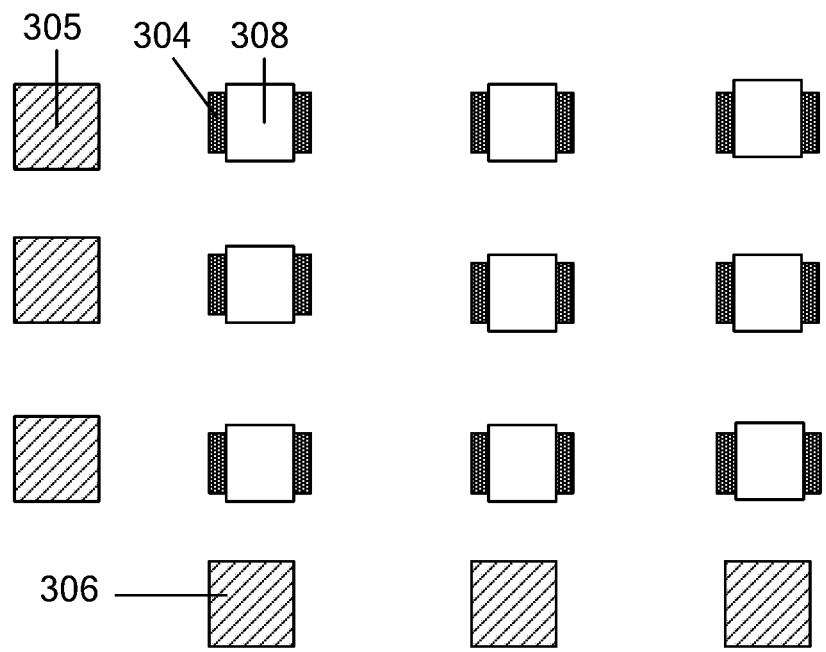
Figure 3:
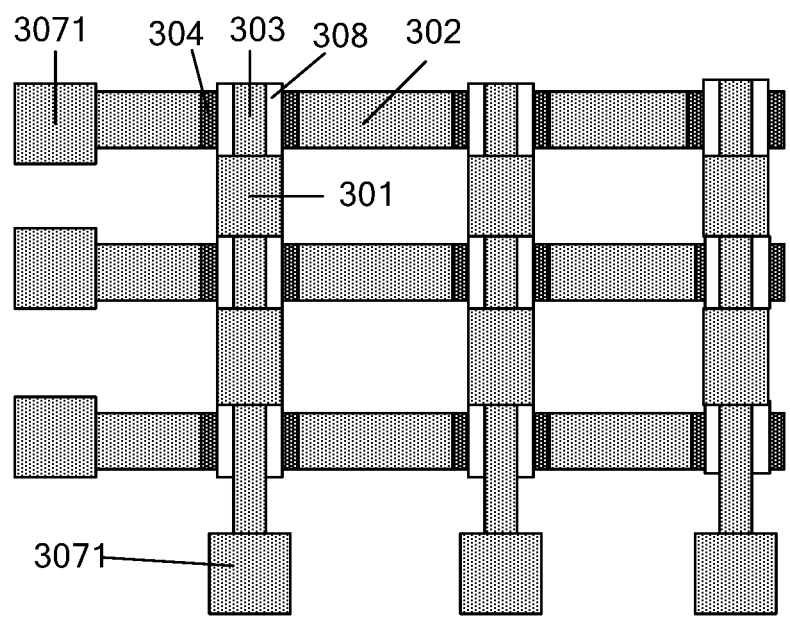
Figure 4:
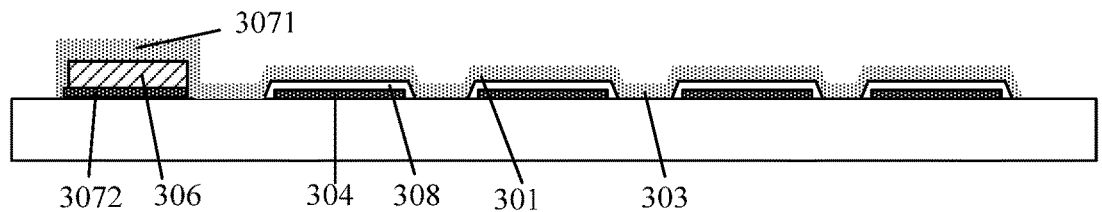
FIG. 4 is an exploded planer schematic view the touch panel according to the first embodiment of the present disclosure.

FIGS. 3(a)-(c) illustrate exploded planar schematic views of the touch panel according to the first embodiment of the present disclosure; and FIG. 4 is a cross sectional schematic view of the touch panel according to the first embodiment of the present disclosure. As shown in FIGS. 3(a)-(c) and FIG. 4, it comprises:

a second connecting wires 304 and a second transparent conductive layer 3072 which are formed in the same layer; for details see FIG. 3(a);

a plurality of a first electrode leads 305 for leading the first electrodes 301, which are connected to each other in the first direction, out of a touch area; for details see FIG. 3(b);

a plurality of a second electrode leads 306 for leading the second electrodes 302, which are connected to each other in the second direction, out of the touch area; for details see FIG. 3(b);

a plurality of first electrodes 301, a plurality of second electrodes 302, first connecting wires 303 and a first transparent conductive layer 3071 formed in the same layer. The plurality of first electrodes 301 are connected to each other in a first direction by first connecting wires 303. The plurality of second electrodes 302 are connected to each other in a second direction by second connecting wires 304; for details see FIGS. 3(c) and 4; Alternatively, the first and second connecting wires 303, 304 are more than one in number and are connected between the plurality of the first electrodes 301 and the second electrodes 302, respectively.

The touch panel further comprises a light-shielding layer (not shown in the Figure) which is formed in a border area around the touch area and is used to prevent light leaking in the border area. The plurality of first and second electrode leads 305, 306 are located on the light shielding layer. The first and second electrode leads 305, 306 may be formed on the same side or different sides of the light-shielding layer.

The first transparent conductive layer 3071 is formed on the upper and lateral surfaces of each of the first and second electrode leads 305, 306. The second transparent conductive layer 3072 is formed on the lower surface of each of the first and second electrode leads 305, 306. The first transparent conductive layer 3071 contacts the second transparent conductive layer 3072 at edges of the first and second electrode leads so as to form enclosed spaces which package respective ones of the first and second electrode leads 305, 306 completely, see FIG. 4.

In the above embodiment of the present disclosure, the first and second transparent conductive layers 3071, 3072 are used to package the first and second electrode leads 305, 306, which may prevent the first and second electrodes leads 305, 306 from being oxidized and save the step of making a protection layer on the electrode leads separately to prevent oxidation and increase adhesion. As the first and second transparent conductive layer 3071, 3072 are electrically conductive, they will not affect electric connection between the first and second electrode leads 305, 306 and external circuits. Further, the first and second electrode leads 305, 306 are packaged by the second and first transparent conductive layers completely without an exposed area, which may prevent the first and second electrode leads from being oxidized and may increase adhesion. At the same time, as the first and second transparent conductive layers 3071, 3072 are respectively formed in the same layer as at least one of the first and second electrodes, the first and second connecting wires, there is no additional manufacturing steps when manufacturing the above touch panel.

Of course, as a modification of the above embodiment, the second transparent conductive layer may be omitted from the above mentioned structure, and merely the first transparent conductive layer on the upper and lateral surfaces of the electrode leads are retained, such that it covers the upper and lateral surfaces of the electrode leads completely and form closed spaces with the substrate, which may also achieve the same effect. Of course, in other modified embodiments, the first transparent conductive layer may only cover the upper surface of the electrode leads, which also has the function of preventing oxidization and enhancing adhesion. Further, in other embodiments, the transparent conductive layer may only formed on the lateral surface of the first and second electrode leads, so as to prevent oxidization of the lateral surface of the electrode leads.

In an embodiment of the present disclosure, the first electrodes 301 and the second electrodes 302 are arranged to intersect with each other. The first electrodes 301 are connected to each other in a first direction by first connecting wires 303. The second electrodes 302 are connected to each other in a second direction by second connecting wires 304. An insulating layer 308 is formed between the first and second connecting wires 303, 304.

The first connecting wires 303 for connecting the first electrodes 301 are formed in the same layer as the first and second electrodes 301, 302, while the second connecting wires 304 for connecting the second electrodes 302 are formed in a different layer and it is connected with the second electrodes 302 by way of upper or lower bridging.

The upper bridging means that forming an insulating layer 308 at the position of the second connecting wires 304 after the first and second electrodes 301, 302 and the first connecting wires 303 are formed, then forming the second connecting wires 304 on the insulating layer 308 and electrically connecting both ends of the second connecting wires 304 with two adjacent second electrodes 302. The lower bridging means that forming the second connecting wires 304 firstly at the corresponding positions, then forming the first and second electrodes 301, 302 and the first connecting wires 303 after a insulating layer is formed on the second connecting wires 304, in which both ends of the second connecting wires 304 are electrically connected with two adjacent second electrodes 302. The insulating layer is intended to make the first and second connecting wires 303, 304 insulate from each other at the position where the first and second connecting wires 303, 304 intersect. FIGS. 3(a)-(c) and FIG. 4 illustrate a lower bridging structure.

The first transparent conductive layer 3071 is formed in the same layer as the first and second electrodes 301, 302, and the first connecting wires 303 are formed, and it is formed on the upper surface and the lateral surfaces of each of the first and second electrodes leads 305, 306, or below each of the first and second electrodes leads 305, 306. The second transparent conductive layer 3072 is formed in the same layer as the second connecting wires 304, and it is formed on the upper surface and the lateral surfaces of each of the first and second electrodes leads 305, 306, or below each of the first and second electrodes leads 305, 306. That is, the first and second transparent conductive layer 3071, 3072 are formed above and below the first and second electrode leads 305, 306, and on the lateral surfaces of the first and second electrode leads 305, 306, which packages the first and second electrode leads 305, 306 completely. The lower conductive layer is formed on the lower surface of the first and second electrode leads 305, 306, and its area is equal to or slightly larger than the area of the first and second electrode leads 305, 306. The upper conductive layer is formed on both of the upper surface and the lateral surfaces of the first and second electrode leads 305, 306, so as to be arranged to contact with the lower conductive layer at the edges of the first and second electrode leads 305, 306 and form closed spaces.

For the manner of upper bridging, the first transparent conductive layer 3071 is located on the lower surfaces of the first and second electrode leads 305, 306, and the second transparent conductive layer 3072 is located on the upper and lateral surfaces of the first and second electrode leads 305, 306, and is arranged to contact with the first transparent conductive layer at the edges around the first and second electrode leads 305, 306.

For the manner of lower bridging, the second transparent conductive layer 3072 is located on the lower surfaces of the first and second electrode leads 305, 306, and the first transparent conductive layer 3071 is located on the upper and lateral surfaces of the first and second electrode leads 305, 306, and is arranged to contact with the second conductive layer at the edges around the first and second electrode leads 305, 306.

optionally, The first and second transparent conductive layer 3071, 3072, the first and second electrodes 301, 302 and the first and second connecting wires 303, 304 are made from a same material.

The first and second transparent conductive layer 3071, 3072 are made from a transparent conductive material, such as a transparent metal oxide. The transparent metal oxide comprises indium tin oxide (ITO), zinc oxide (IZO) and the like. The first and second electrodes 301, 302 and the first and second connecting wires 303, 304 may also be made from a transparent conductive material, such as a transparent metal oxide.

Of course, the present disclosure is not limited to the above mentioned manner. It is possible that the first electrodes 301 and the first connecting wires 302 are formed in a same layer, while the second electrodes 302 and the second connecting wires 304 are formed in a same layer, and an insulating layer is formed at the position where the first and second connecting wires 303, 304 intersect with each other. The first transparent conductive layer 3071 is formed in a same layer as that of the first electrodes 301 and the first connecting wires 303, while the second transparent conductive layer 3072 is formed in a same layer as that of the second electrodes 302 and the second connecting wires 304. In such a construction, the first and second transparent conductive layer 3071, 3072 are made from a transparent conductive material, other arrangement are same as that recited in the first embodiment.

The key point of the present disclosure is in that the exposed surfaces of the electrode leads are packaged by transparent conductive material and the transparent conductive layer is formed in a same layer as at least one of the first and second electrodes, the first and second connecting wires, such that it will not need an additional manufacturing process for manufacturing the touch panel and will prevent oxidization of the electrode leads. Any modification to the solution of the prevent disclosure basing on such an concept will be within the protection scope of the present disclosure.

An embodiment of the present disclosure further provides a method for manufacturing touch panel, including forming a plurality of a first electrodes, a plurality of a second electrodes, a plurality of a first electrode leads and a plurality of a second electrode leads; the plurality of first electrodes are connected to each other in a first direction by first connecting wires, the plurality of second electrodes are connected to each other in a second direction by second connecting wires; the plurality of the first electrode leads serve to lead the first electrodes, which are connected to each other in the first direction, out of a touch area; the plurality of the second electrode leads serve to lead the second electrodes, which are connected to each other in the second direction, out of the touch area.

The method further includes: forming a first transparent conductive layer in the same layer as at least one of the first and second electrodes, the first and second connecting wires, and the first transparent conductive layer covers surfaces of each of the first and second electrode leads.

Alternatively, the method further comprises forming a second transparent conductive layer in the same layer as at least one of the first and second electrodes, the first and second connecting wires, and the second transparent conductive layer is formed below each of the first and second electrode leads and contacts the first transparent conductive layer so as to form enclosed spaces which package respective ones of the first and second electrode leads respectively.

Figure 5:
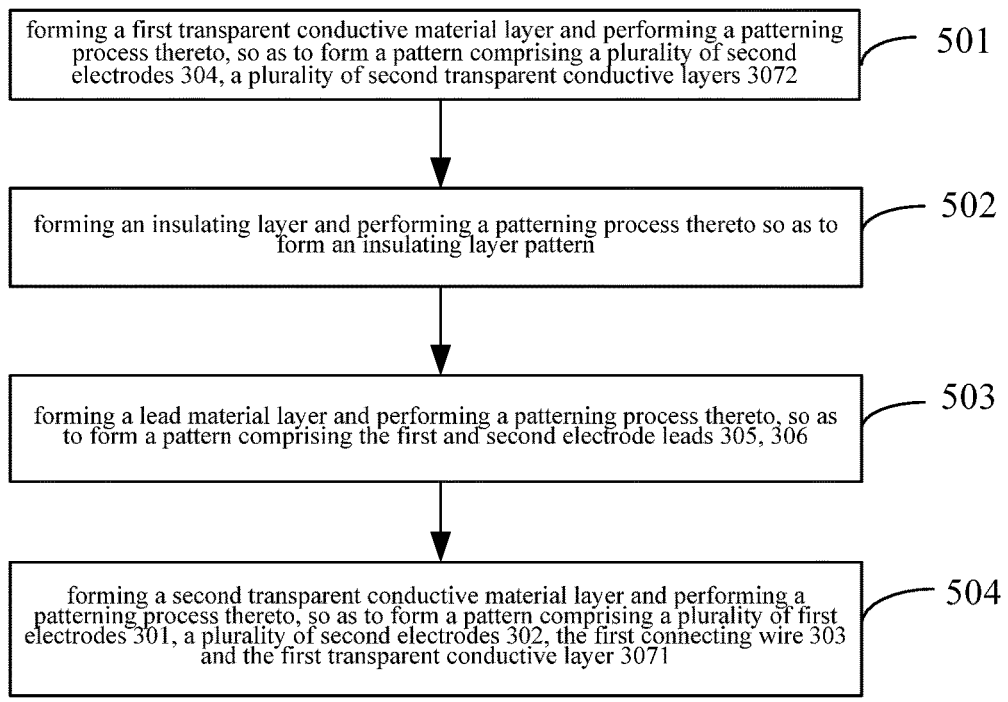
FIG. 5 is a flow chart of the method for manufacturing the touch panel according to the first embodiment of the present disclosure.

FIG. 5 illustrates a flow chart of the method for manufacturing the touch panel according to the first embodiment of the present disclosure, and the processes are shown in FIGS. 3(a)-(c) in detail. The specific processes and steps of the present disclosure will be described by taking the manner of connecting the second electrodes by lower bridging as an example in the present embodiment. As shown in FIG. 5, it comprises:

Step 501: forming a first transparent conductive material layer and performing a patterning process thereto, so as to form a pattern comprising a plurality of second electrodes 304, a plurality of second transparent conductive layers 3072. The plurality of second connecting wires 304 are respectively formed at the position corresponding to the position to connect two adjacent second electrodes 302; the plurality of second transparent conductive layers 3072 are respectively formed at the position corresponding to the position of each of the first and second electrodes leads 305, 306, that is, located at the first and second lateral sides of the array structure formed by the first and second electrodes 301, 302, and the first and second lateral sides are located at two adjacent sides of the touch area and are perpendicular to the first and second directions.

Step 502: forming an insulating layer and performing a patterning process thereto so as to form an insulating layer pattern. Only the insulating layer in intersection area of the first and second connecting wires 303, 304 is retained when the patterning process is performed on the insulating layer. That is, the insulating layer pattern at least includes patterns that correspond to the intersection areas of the first and second connecting wires 303, 304;

Step 503: forming a lead material layer and performing a patterning process thereto, so as to form a pattern comprising the first and second electrode leads 305, 306, in which the first and second electrode leads 305, 306 are formed over the second transparent conductive layer 3072. The first electrode leads 305 serve to lead the first electrodes 301, which are connected to each other in the first direction, out of a touch area, while the second electrode leads 306 serve to lead the second electrodes 302, which are connected to each other in the second direction, out of the touch area;

Step 504: forming a second transparent conductive material layer and performing a patterning process thereto, so as to form a pattern comprising a plurality of first electrodes 301, a plurality of second electrodes 302, the first connecting wire 303 and the first transparent conductive layer 3071; in which the plurality of first electrodes 301 are connected to each other in a first direction by first connecting wires 303 and the plurality of first and second electrodes 301, 302 are arranged to intersect to each other. The second electrodes 302 are electrically connected to the second connecting wire 304. The first transparent conductive layer 3071 is formed on the upper and lateral surfaces of the first and second electrode leads 305, 306, and the first transparent conductive layer 3071 contacts the second transparent conductive layer 3072 below it so as to form enclosed spaces which package respective ones of the first and/or second electrode leads 305, 306 individually.

Figure 6:
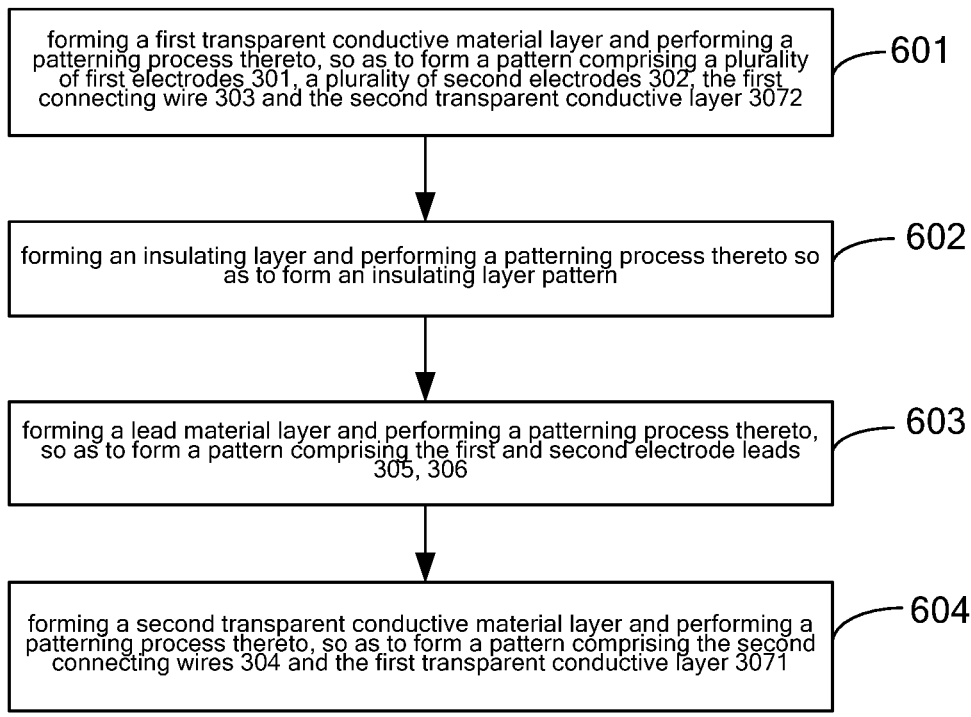
FIG. 6 is a flow chart of the method for manufacturing the touch panel according to the second embodiment of the present disclosure.

FIG. 6 illustrates a flow chart of the method for manufacturing the touch panel according to a second embodiment of the present disclosure. The specific processes and steps of the present disclosure will be described with the manner of connecting the second electrodes by upper bridging as an example in the present embodiment. As shown in FIG. 6, it comprises:

Step 601: forming a first transparent conductive material layer and performing a patterning process thereto, so as to form a pattern comprising a plurality of first electrodes 301, a plurality of second electrodes 302, the first connecting wire 303 and the second transparent conductive layer 3072; in which the plurality of first electrodes 301 are connected to each other in a first direction by first connecting wires 303 and the plurality of first and second electrodes 302 are arranged to intersect with each other. The second transparent conductive layer 3072 is formed at the position corresponding to the position of each of the first and second electrodes leads 305, 306, that is, located at the first and second lateral sides of the array structure formed by the first and second electrodes 301, 302, and the first and second lateral sides are located at two adjacent sides of the touch area and are perpendicular to the first and second directions.

Step 602: forming an insulating layer and performing a patterning process thereto so as to form an insulating layer pattern. Only the insulating layer in intersection areas of the first and second connecting wires 303, 304 may be retained when the patterning process is performed on the insulating layer. That is, the insulating layer pattern at least includes patterns that correspond to the intersection areas of the first and second connecting wires 303, 304;

Step 603: forming a lead material layer and performing a patterning process thereto, so as to form a pattern comprising the first and second electrode leads 305, 306, in which the first and second electrode leads 305, 306 are formed over the second transparent conductive layer 3072. The first electrode leads 305 serve to lead the first electrodes 301, which are connected to each other in the first direction, out of a touch area, while the second electrode leads 306 serve to lead the second electrodes 302, which are connected to each other in the second direction, out of the touch area;

Step 604: forming a second transparent conductive material layer and performing a patterning process thereto, so as to form a pattern comprising the second connecting wires 304 and the first transparent conductive layer 3071. The second connecting wires 304 serve to connect the pattern of two adjacent second electrodes 302 in the second connecting direction. The first transparent conductive layer 3071 is formed on the upper and lateral surfaces of the first and second electrodes leads 305, 306, and the first transparent conductive layer 3071 contacts the second transparent conductive layer 3072 below it so as to enclosed spaces which package respective ones of the first and second electrode leads 305, 306 separately.

The method according the embodiment of the present disclosure is not limited to the steps of the above method.

Figure 7:
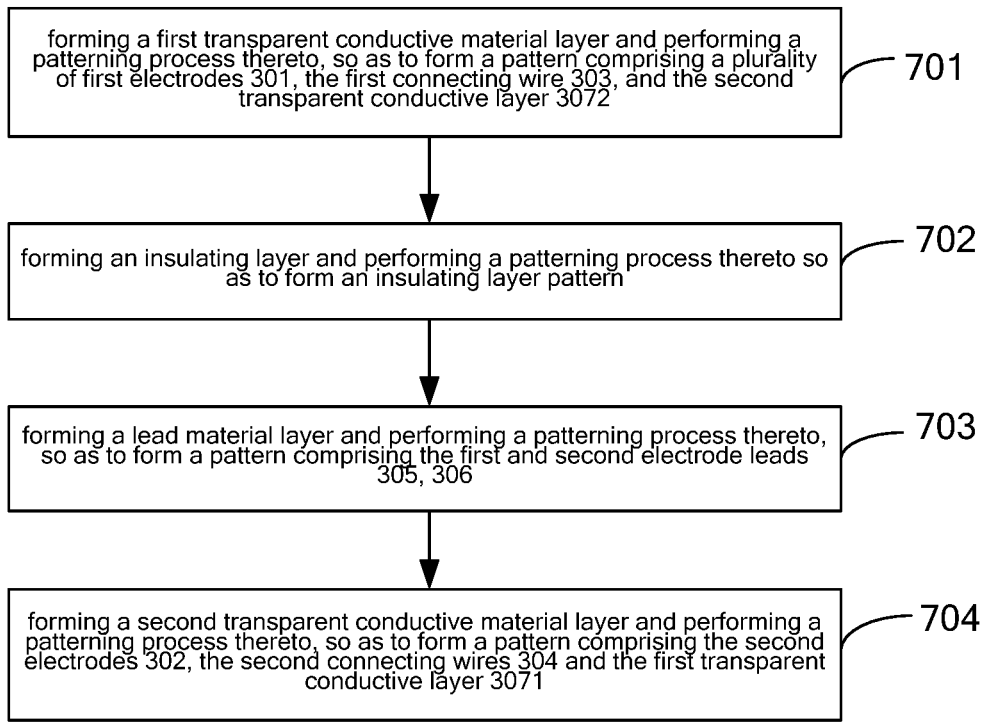
FIG. 7 is a flow chart of the method for manufacturing the touch panel according to the third embodiment of the present disclosure.

FIG. 7 illustrates a flow chart of the method for manufacturing the touch panel according to a third embodiment of the present disclosure. As shown in FIG. 7, the method comprises:

Step 701: forming a first transparent conductive material layer and performing a patterning process thereto, so as to form a pattern comprising a plurality of first electrodes 301, the first connecting wire 303, and the second transparent conductive layer 3072; in which the plurality of first electrodes 301 are connected to each other in a first direction by first connecting wires 303 The second transparent conductive layer 3072 is formed at the position corresponding to the position of each of the first and second electrodes leads 305, 306, that is, located at the first and second lateral sides of the array structure formed by the first and second electrodes 301, 302, and the first and second lateral sides are located at two adjacent sides of the touch area and are perpendicular to the first and second directions.

Step 702: forming an insulating layer and performing a patterning process thereto so as to form an insulating layer pattern. When the patterning process is performed on the insulating layer, the insulating layer in the area of the plurality of first electrodes 301 and the first connecting wires 303 should be retained so as to prevent electrical conduction between the first and second electrodes 301, 302 and electrical conduction between the first and second connecting wires 303, 304 after the second electrodes 302 and the second connecting wires 304 are made in the following steps. That is, the insulating layer pattern at least includes patterns that correspond to the area of the plurality of the first electrodes 301, and the intersection areas of the first and second connecting wires 303, 304;

Step 703: forming a lead material layer and performing a patterning process thereto, so as to form a pattern comprising the first and second electrode leads 305, 306, in which the first and second electrode leads 305, 306 are formed over the second transparent conductive layer 3072. The first electrode leads 305 serves to lead the first electrodes 301, which are connected to each other in the first direction, out of a touch area, while the second electrode leads 306 serves to lead the second electrodes 302, which are connected to each other in the second direction, out of the touch area;

Step 704: forming a second transparent conductive material layer and performing a patterning process thereto, so as to form a pattern comprising the second electrodes 302, the second connecting wires 304 and the first transparent conductive layer 3071. The second electrodes 302 are arranged to intersect with the first electrodes 301 and are connected to each other by second connecting wires 304 in a second direction. The first transparent conductive layer 3071 is formed on the upper and lateral surfaces of the first and second electrode leads 305, 306, and the first transparent conductive layer 3071 contacts the second transparent conductive layer 3072 below it so as to form enclosed spaces which package respective ones of the first and second electrode leads 305, 306.

In the above mentioned methods, before the lead material layer is formed, it further comprises the step of forming a light shielding layer in a border area around the touch area, and the first and second electrode leads are located on the light shielding layer.

In the above mentioned methods, the second connecting wires between the second electrodes are in form of lower bridging in the touch panel made by the method shown in FIG. 5 and in form of upper bridging in FIG. 6, while in FIG. 7, the first and second electrodes are formed in different layers. The common points among the methods in FIGS. 5-7 are that the first and second electrodes, the first and second connecting wires should be formed at least in two layers when they are manufactured. The present disclosure utilizes the steps of forming two layers, such that the second the first transparent conductive layers are formed respectively while each layer is formed, which makes the first and second electrode leads are packaged by the second and first transparent conductive layers completely. It prevents the first and second electrode leads from being oxidized and enhances adhesion thereof. At the same time, the step of making separately a protection layer on the electrode leads so as to prevent oxidation and increase adhesion is saved. Therefore, the above mentioned method proposed by the present disclosure may save processes and reduce cost.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Further, the references of the elements in the claims should not be deemed as limit to the scope of the present disclosure.

What is claimed is:

1. A touch panel, comprising:
 a plurality of first electrodes which are connected to each other in a first direction by at least one first connecting wire;
 a plurality of second electrodes which are connected to each other in a second direction by at least one second connecting wire;
 a plurality of first electrode leads for leading the first electrodes, which are connected to each other in the first direction, out of a touch area; and
 a plurality of second electrode leads for leading the second electrodes, which are connected to each other in the second direction, out of the touch area,
 wherein the touch panel further comprises at least one transparent conductive layer which is formed on at least one surface of each of the first and/or second electrode leads and which is formed in the same layer as at least one of the first and second electrodes, the first and second connecting wires,
 wherein the at least one transparent conductive layer comprises a first transparent conductive layer which is formed directly on the upper surface of each of the first and/or second electrode leads, wherein the first transparent conductive layer is further formed on at least one lateral surface of each of the first and second electrode leads, and wherein the at least one transparent conductive layer further comprises a second transparent conductive layer, which is formed directly on the lower surface of each of the first and/or second electrode leads, and which contacts the first transparent conductive layer so as to form enclosed spaces which package respective ones of the first and/or second electrode leads, and wherein:

the first transparent conductive layer is formed in the same layer as the first and second electrodes and the at least one first connecting wire, and the second conductive layer is formed in the same layer as the at least one second connecting wire; or the first transparent conductive layer is formed in the same layer as the at least one second connecting wire, and the second conductive layer is formed in the same layer as the first and second electrodes and the at least one first connecting wire; or the first transparent conductive layer is formed in the same layer as the first electrodes and the at least one first connecting wire, and the second conductive layer is formed in the same layer as the second electrodes and the at least one second connecting wire.

2. The touch panel according to claim 1, wherein the at least one first connecting wires comprises a plurality of the first connecting wires which are connected between the plurality of the first electrodes respectively, and the at least one second connecting wires comprises a plurality of the second connecting wires which are connected between the plurality of the second electrodes respectively.

3. The touch panel according to claim 1, wherein an insulating layer is formed between the first and second connecting wires.

4. The touch panel according to claim 1, wherein the first transparent conductive layer is formed in the same layer as the first and second electrodes, and the first connecting wire, and the second transparent conductive layer is formed in the same layer as the second connecting wire.

5. The touch panel according to claim 1, wherein the first transparent conductive layer is formed in the same layer as the second connecting wire, and the second transparent conductive layer is formed in the same layer as the first and second electrodes, and the first connecting wire.

6. The touch panel according to claim 1, wherein the first transparent conductive layer is formed in the same layer as the first electrodes and the first connecting wire, and the second transparent conductive layer is formed in the same layer as the second electrodes and the second connecting wire.

7. The touch panel according to claim 1, wherein the at least one transparent conductive layer, the first and second electrodes and the first and second connecting wires are made from the same material.

8. The touch panel according to claim 7, wherein the at least one transparent conductive layer, the first and second electrodes and the first and second connecting wires are made from transparent metal oxide.

9. The touch panel according to claim 1, wherein the touch panel further comprises a light-shielding layer which is located in a border area around the touch area.

10. The touch panel according to claim 9, wherein the first and second electrode leads are located on the light shielding layer.

11. A touch display device comprising the touch panel according to claim 1.

12. A method for manufacturing a touch panel, comprising steps of:

forming a plurality of first electrodes, a plurality of second electrodes, a plurality of first electrode leads and a plurality of second electrode leads, such that the plurality of first electrodes are connected to each other in a first direction by first connecting wires, the plurality of second electrodes are connected to each other in a second direction by second connecting wires, the plurality of first electrode leads lead the first electrodes, which are connected to each other in the first direction, out of a touch area, and the plurality of second electrode leads lead the second electrodes, which are connected to each other in the second direction, out of the touch area, wherein the method further comprises a step of:

forming at least one transparent conductive layer in the same layer as at least one of the first and second electrodes, and the first and second connecting wires, such that the at least one transparent conductive layer is formed on a surface of each of the first and/or second electrode leads, wherein the at least one transparent conductive layer comprises a first transparent conductive layer which is formed directly on upper and lateral surfaces of each of the first and second electrode leads, and wherein the at least one transparent conductive layer further comprises a second transparent conductive layer, which is formed directly on a lower surface of each of the first and second electrode leads, and which contacts the first transparent conductive layer so as to form enclosed spaces which package respective ones of the first and second electrode leads, and wherein:

the first transparent conductive layer is formed in the same layer as the first and second electrodes and the at least one first connecting wire, and the second conductive layer is formed in the same layer as the at least one second connecting wire; or the first transparent conductive layer is formed in the same layer as the at least one second connecting wire, and the second conductive layer is formed in the same layer as the first and second electrodes and the at least one first connecting wire; or the first transparent conductive layer is formed in the same layer as the first electrodes and the at least one first connecting wire, and the second conductive layer is formed in the same layer as the second electrodes and the at least one second connecting wire.

13. The method according to claim 12, wherein the steps comprise:

forming a first transparent conductive material layer and performing a patterning process thereto, so as to form a pattern comprising the plurality of first electrodes, the first connecting wires, the plurality of second electrodes and the second transparent conductive layer, such that the second transparent conductive layer is formed at positions corresponding to the plurality of first electrode leads and the plurality of second electrode leads;

forming an insulating material layer and performing a patterning process thereto so as to form an insulating layer pattern;

forming a lead material layer and performing a patterning process thereto, so as to form a pattern comprising the plurality of first electrode leads and the plurality of second electrode leads; and forming a second transparent conductive material layer and performing a patterning process thereto, so as to form a pattern comprising the second connecting wires and the first transparent conductive layer, such that the first transparent conductive layer is formed on the upper and lateral surfaces of the first and second electrode leads, wherein the first transparent conductive layer contacts the second transparent conductive layer so as to form enclosed spaces which package respective ones of the first and/or second electrode leads, and the insulating layer pattern at least comprises a pattern corresponding to an area where the first and second connecting wires cross each other.

14. The method according to claim 12, wherein the steps comprise:

forming a first transparent conductive material layer and performing a patterning process thereto, so as to form a pattern comprising the second connecting wires and the second transparent conductive layer, such that the second transparent conductive layer is formed at positions corresponding to the plurality of first electrode leads and the plurality of second electrode leads;

forming an insulating layer and performing a patterning process thereto so as to form an insulating layer pattern;

forming a lead material layer and performing a patterning process thereto, so as to form a pattern comprising the plurality of first electrode leads and the plurality of second electrode leads; and forming a second transparent conductive material layer and performing a patterning process thereto, so as to form a pattern comprising the plurality of first electrodes, the first connecting wires, the plurality of second electrodes and the first transparent conductive layer, such that the first transparent conductive layer is formed on the upper and lateral surfaces of the plurality of the first and second electrode leads, wherein the first transparent conductive layer contacts the second transparent conductive layer so as to form enclosed spaces which package respective ones of the first and second electrode leads, and the insulating layer pattern at least comprises a pattern corresponding to an area where the first and second connecting wires cross each other.

15. The method according to claim 12, wherein the steps comprise:

forming a first transparent conductive material layer and performing a patterning process thereto, so as to form a pattern comprising the plurality of first electrodes, the first connecting wires and the second transparent conductive layer, such that the second transparent conductive layer is formed at positions corresponding to the plurality of first electrode leads and the plurality of second electrode leads;

forming an insulating layer and performing a patterning process thereto so as to form an insulating layer pattern;

forming a lead material layer and performing a patterning process thereto, so as to form a pattern comprising the plurality of first electrode leads and the plurality of second electrode leads; and forming a second transparent conductive material layer and performing a patterning process thereto, so as to form a pattern comprising the plurality of second electrodes, the second connecting wires and the first transparent conductive layer, such that the first transparent conductive layer is formed on the upper and lateral surfaces of the plurality of the first and second electrode leads, wherein the first transparent conductive layer contacts the second transparent conductive layer so as to form enclosed spaces which package respective ones of the first and second electrode leads, and the insulating layer pattern at least comprises a pattern corresponding to an area where the plurality of first electrodes is formed.

\* \* \* \* \*